United States Patent [19]

Balkanli

[11] 4,444,055
[45] Apr. 24, 1984

[54] COMPENSATING TRANSDUCER DIGITIZER

[76] Inventor: Hayati Balkanli, P.O. Box 35725, Houston, Tex. 77035

[21] Appl. No.: 285,385

[22] Filed: Jul. 20, 1981

[51] Int. Cl.³ .......................... G01L 9/00; G01L 19/04
[52] U.S. Cl. ..................................................... 73/708
[58] Field of Search ................ 73/733, 734, 735, 708, 73/718, 719, 722, 724, 725, 728; 331/65, 66

[56] References Cited

U.S. PATENT DOCUMENTS

| | | | |
|---|---|---|---|
| 2,468,703 | 4/1949 | Hammel | 374/143 |
| 3,355,949 | 12/1967 | Elwood et al. | 374/143 |
| 3,977,245 | 8/1976 | Clark et al. | 73/151 |
| 4,279,155 | 7/1981 | Balkanli | 374/188 |

Primary Examiner—Donald O. Woodiel
Attorney, Agent, or Firm—Richard K. Robinson

[57] ABSTRACT

A compensating transducer digitizer circuit provides for compensating the digital output of a measuring transducer with the digital output of a compensating transducer through the interaction of the quasi-digital outputs of the compensating transducer and measuring transducer without altering their quasi-digital outputs compensating transducer.

7 Claims, 6 Drawing Figures

COMPENSATING TRANSDUCER DIGITIZER

BACKGROUND OF THE INVENTION

This invention relates to circuits for compensating the output of a measuring transducer with the output from a compensating transducer such as a circuit for compensating the output of a pressure transducer with the output of a temperature transducer.

The application of modern day instrumentation and technology often requires the precise measurement of environmental conditions, such as temperature and pressure. The transducers that are used to sense the environmental conditions are often dual type transducers. That is to say, a transducer whose primary application is that of a pressure transducer is sensitive to variations in temperature, and similarly, a temperature transducer is sensitive to variations of pressure. In either case, this sensitivity is considered an anomaly of the primary application and is undesirable. In applications where the precise measurements of environmental conditions are required, the dual sensing of the transducers are unwanted, particularly in applications such as oil well instrumentation where precision instruments are inserted into the extreme environmental conditions present in the oil well or "down hole". The common type of pressure transducer used for this application is the bourdon tube transducer which provides the measurement of pressure and in some cases temperature. Variations in temperature will cause a change in the modulus of elasticity of the bourdon tube material of the pressure transducer, and as such, will result in an error in the output of the transducers.

One method of dealing with this problem was disclosed in U.S. Pat. No. 4,033,186 which provided a method and apparatus for down hole pressure and temperature measurements and also disclosed a multiplexer for processing the down hole gage signals from a plurality of parametric sensors and a digital converter for digitizing the output of the multiplexer.

In U.S. Pat. No. 3,977,245 there was disclosed an apparatus for digitally recording the values of pressure and temperature and other parameters in a bore hole logging instrument. In one embodiment, the values of the earth parameters are converted to an AC signal whose frequency is a function of the value of the measured earth parameter. Clock means are provided for presenting at selected time intervals voltage pulses of selected short time length. The clock signal is gated to a counter for a selected short interval of time, and the count of the counter becomes a measure of the earth parameter. A solid state memory is provided in the output of the counter for the storing of the measured earth parameters in the form of binary bits stored in the memory.

SUMMARY OF THE INVENTION

A two dimensional self compensating transducer digitizer circuit provides for compensating the digital output of a measuring transducer with the output of a compensating transducer through the interaction of the quasi-digital outputs of the compensating transducer and the measuring transducer without altering their quasi-digital outputs.

The pulses from the measuring transducer which reflect either temperature or pressure are accumulated in a first accumulator until two preselected numbers of pulses are obtained while the pulses from the compensating transducer, which will be temperature if pressure is being measured or vice-versa, are simultaneously accumulated in a serial accumulator until the first preselected number of pulses are accumulated in the first accumulator. After the accumulation of the first preselected number of pulses by the first accumulator, only the pulses of the measuring transducer can be accumulated in the first, second and a third accumulator, until the second preselected (N) number of pulses less one are accumulated in the first accumulator. At this point in time, the second and third accumulators stop accumulating the measuring transducer pulses and the first accumulator will accumulate one more pulse. The accumulation of this one additional pulse will give the first accumulator a count of the second preselected number and will cause the first accumulator to stop accumulating the pulses of the measuring transducer. The difference between the total pulses accumulated in the second accumulator and the pulses that were accumulated therein from the compensating transducer is the compensated pressure reading. This difference is contained in the number of pulses accumulated by the third accumulator.

The minimum number of circuit elements required to implement this circuit and the lack of timing circuits and clock generators facilitates the application thereof in extreme environmental conditions such as in the extreme environmental conditions encountered deep within an oil well.

DETAILED DESCRIPTION OF THE PREFERRED EMBODIMENT

Figure 1:
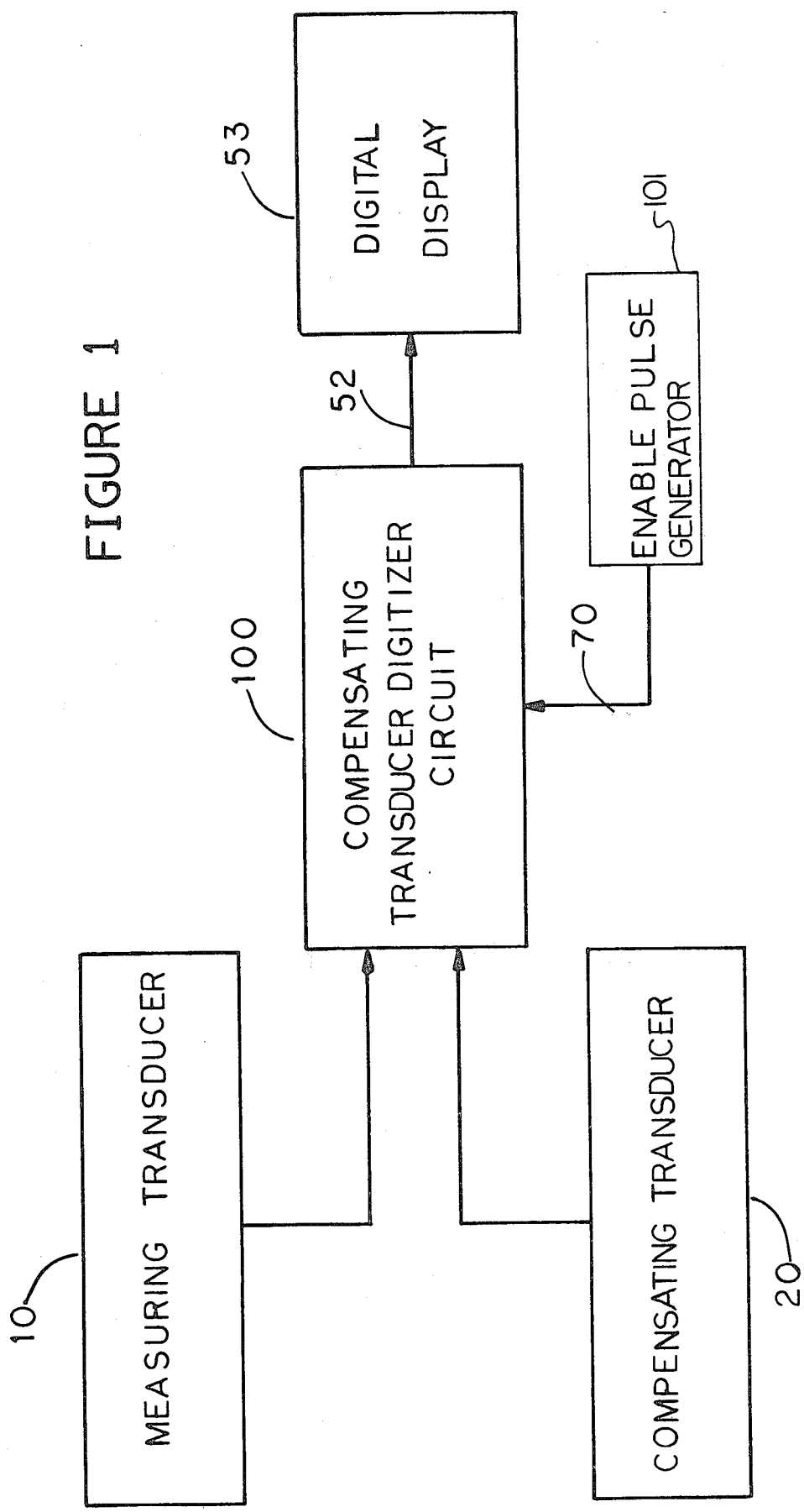
FIG. 1 is a block diagram of an environmental measuring system according to the invention.

FIG. 1, to which reference should now be made, is a block diagram of an environmental measuring system according to the invention. Upon the occurrence of the enabling pulse on conductor 70 from an enable pulse generator 101 which is a device such as a biased push button switch or a computer operated biased relay contact, the compensating transducer digitizer circuit 100 accumulates the pulses from the measuring transducer 10 which represents a first environmental condition such as pressure that is being measured by the measuring transducer 10 and the pulses from the compensating transducer 20 which represent a second environmental condition such as temperature that is being measured by the compensating transducer 20. When the compensating transducer digitizer circuit has accumulated a Preselected Number (PN) of pulses that is a time variable combination of the pulses from the measuring transducer 10 and compensating transducer 20, the compensated measured environmental condition is indicated on the digital readout 53 that is provided by the compensating transducer digitizer circuit 100 via conductor 52.

The preselected number, PN, is readily obtained from the following discussion and is dependent upon the frequency ranges of measuring transducer 10 and compensating transducer 20 amongst other things. The time variable combination of pulses is dependent upon the environmental condition. For example, if the measuring transducer 10 is measuring pressure and the compensating transducer 20 is measuring temperature, when the temperature is close to normal temperature while there is an elevated pressure, then the percentage of pulses from the measuring transducer 10 will be larger than the percentage pulses from the compensating transducer.

Figure 2:
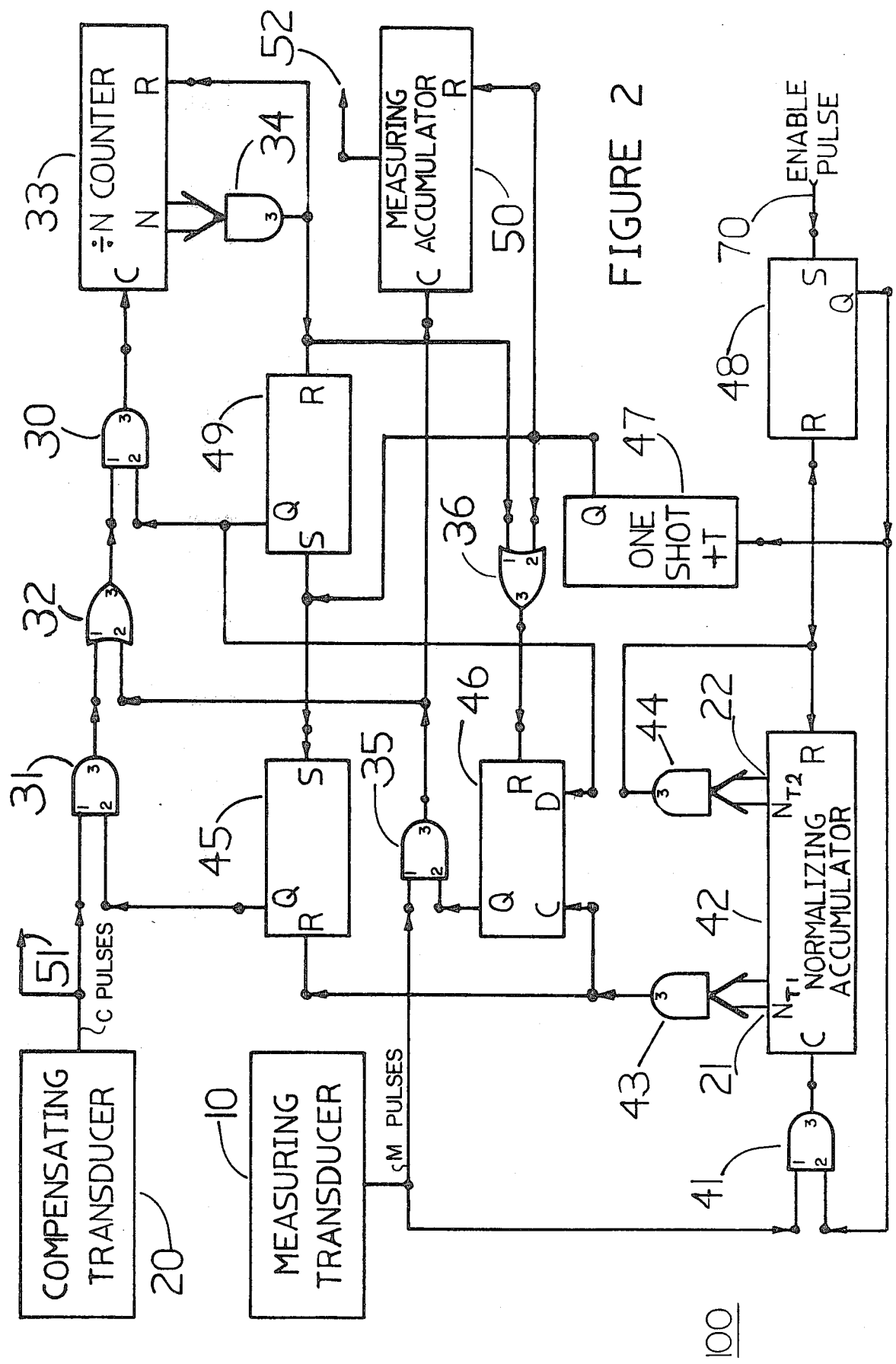
FIG. 2 is a schematic diagram of the compensating circuit of FIG. 1.

A more detailed explanation is provided in the discussion of FIG. 2, to which reference should now be made. FIG. 2 is a schematic diagram of the compensating transducer digitizer circuit 100. The circuit is initialized by an enable pulse which is applied to a set termnal S of a flip-flop 48, by way of conductor 70 from the enable pulse generator 101 of FIG. 1. The Q output of flip-flop 48 enables a one-shot 47, as well as AND-gate 41. The one-shot 47 provides a short duration pulse on its Q terminal that resets a measuring accumulator 50 and flip-flop 46, and sets flip-flops 45 and 49. The measuring transducer 10 provides a string of pulses, hereafter referred to as M pulses, to the AND-gate 41. The M pulses are coupled through terminal 3 of AND-gate 41 to the clock input C of a normalizing accumulator 42. Similarly, the compensating transducer 20 provides a string of pulses, hereafter referred to as C pulses, to the input terminal 1 of AND-gate 31 and because the output terminal of the flip-flop 45 (Q terminal) is high, AND-gate 31 allows the C pulses to be coupled to terminal 1 of the OR-gate 32. Terminal 3 of OR-gate 32 couples the C pulses to the clock input terminal C of divide-by-N counter 33 by way of the AND-gate 30 which is enabled by the output signal from the Q terminal of flip-flop 49.

It should be noted that both the compensating transducer 20 and the measuring transducer 10 can be any of the known types of environmental measuring transducers known in the art, such as strain gages, thermocouples, crystals and bourdon tubes. However, they must meet the requirement of providing a pseudo-digital output whose frequency corresponds to the environmental condition being measured. In the preferred embodiments, the transducers 10 and 20 are the bourdon tube transducers described in my copending application entitled "Bourdon Tube Transducers" filed on Jan. 24, 1980, Ser. No. 115,003, and by reference is incorporated herein.

Returning back to FIG. 2, when the normalizing accumulator 42 has accumulated a first preselected number of M pulses $N_{T1}$, the ambient number, AND-gate 43, which may include inverters (not shown) on the input terminals, decodes the ambient number from the outputs of terminals 21 of counter 42 and provides a pulse, from the time the ambient number is decoded until the counter is incremented by the next M pulse of the measuring transducer 10, to the terminal C of flip-flop 46, as well as to the reset terminal R of flip-flop 45. This decoded ambient numbered pulse disables the AND-gate 31 by the resetting of flip-flop 45 and thus, prevents the transmission of the C pulses from the compensating transducer 20 through the OR-gates 32 and AND-gates 30 to the divide-by-N counter 33. Flip-flop 46 is set by the ambient number pulse because the D terminal has a logic-one provided by the Q terminal fo flip-flop 49. The Q terminal of flip-flop 49 is applied to terminal 2 of AND-gate 35. AND-gate 35 then transmits the M pulses from the measuring transducer 10 to measuring accumulator 50 for indicating the measuring transducer reading, and also to a third accumulator the divide-by-N counter 33 by way of the OR-gate 32.

When the divide-by-N counter 33 has accumulated N counts (the total number of counts) that may include a combination of C pulses and M pulses, AND-gate 34 will have a logic-one output that is applied to the reset terminal R of the divide-by-N counter 33, and the divide-by-N counter 33 is reset. At the same time, flip-flop 49 is reset by the logic-one output of AND-gate 34 which also resets flip-flop 46 via OR-gate 36. Flip-flop 49 prevents further accumulation of pulses by the divide-by-N counter 33 by disabling the AND-gate 30. The final accumulated count N of divide-by-N counter 33 is equal to ($N_{T2}-1$), where $N_{T2}$ is the accumulated count of the normalizing accumulator 42, AND-gate 44 will have a decoded logic-one output on terminal 3. The next M pulse after ($N_{T2}-1$) M pulses from the measuring transducer 10 will cause a positive pulse to be applied to the reset terminal R of the normalizing accumulator 42, as well as to the reset terminal R of flip-flop 48 resetting these circuits and thus prohibiting any further accumulation of pulses until a new enable pulse is applied to the set terminals S of flip-flop 48. The compensated measured parameter is stored in the measuring accumulator 50 and may be displayed by the digital display 53 via conductor 52.

It should be noted that the compensating transducer output may be coupled to a monitor (not shown) vice conductor 51 for indicating the value of the compensating environmental parameter being measured.

FIGS. 3 through 6 are the timing diagrams for the circuit of FIG. 2 for various states of pressure and temperature combinations and are discussed in conjunction with FIG. 2. The terminal numbers refer to the device and terminal of that device as shown on FIG. 2. In addition, the following terms are defined as follows for the preferred embodiment of measuring pressure by the measuring transducer 10.

$$N_{T1} = K(f_{PO})$$

Where $N_{T1}$ is the total number of counts expected from the measuring transducer 10 for zero pressure at ambient temperature, $f_{PO}$ is the frequency of the measuring transducer 10 at zero pressure, and K is an integer depending on the resolution required in the reading of the measuring accumulator 50.

$$f_p = \frac{KN_p}{(T_2) - (T_1)}$$

Where $f_P$ is the frequency of the measuring transducer 10 at any pressure, $N_P$ is the number of pulses counted by the divide-by-N counters 33 and measuring accumulator 50 during the time period between $T_2$ and $T_1$ as illustrated in FIGS. 3 through 6.

N is equal to the total number of counts expected to be accumulated for the maximum anticipated pressure and temperature.

$$N_{T2} = (N+1)$$

Where $N_{T2}$ is the total of pulses to be counted by the normalizing accumulator 42, at which the counter stops counting and also resets itself.

The value of the above mentioned numbers is preselected by knowing the frequency of the transducers versus the environmental conditions they are measuring and compensating.

The preselected numbers $N_{T1}$ and N are fixed. The time duration $(T_2)-(T_1)$ becomes shorter as the compensating transducer frequency increases. This is due to the fact that $T_1$ is a function of the measuring transducer frequency and during which $N_{T1}$ pulses are counted by the normalizing accumulator 42. At the same time, however, more pulses will be accumulated by the divide-by-N counter 33 during the time period $T_1$ because of the increase in the frequency of the compensating transducer 20. Hence, the pulses counted by the measuring accumulator 50 during the time period of $(T_2)-(T_1)$ will be less than that of the uncompensated number.

Figure 3:
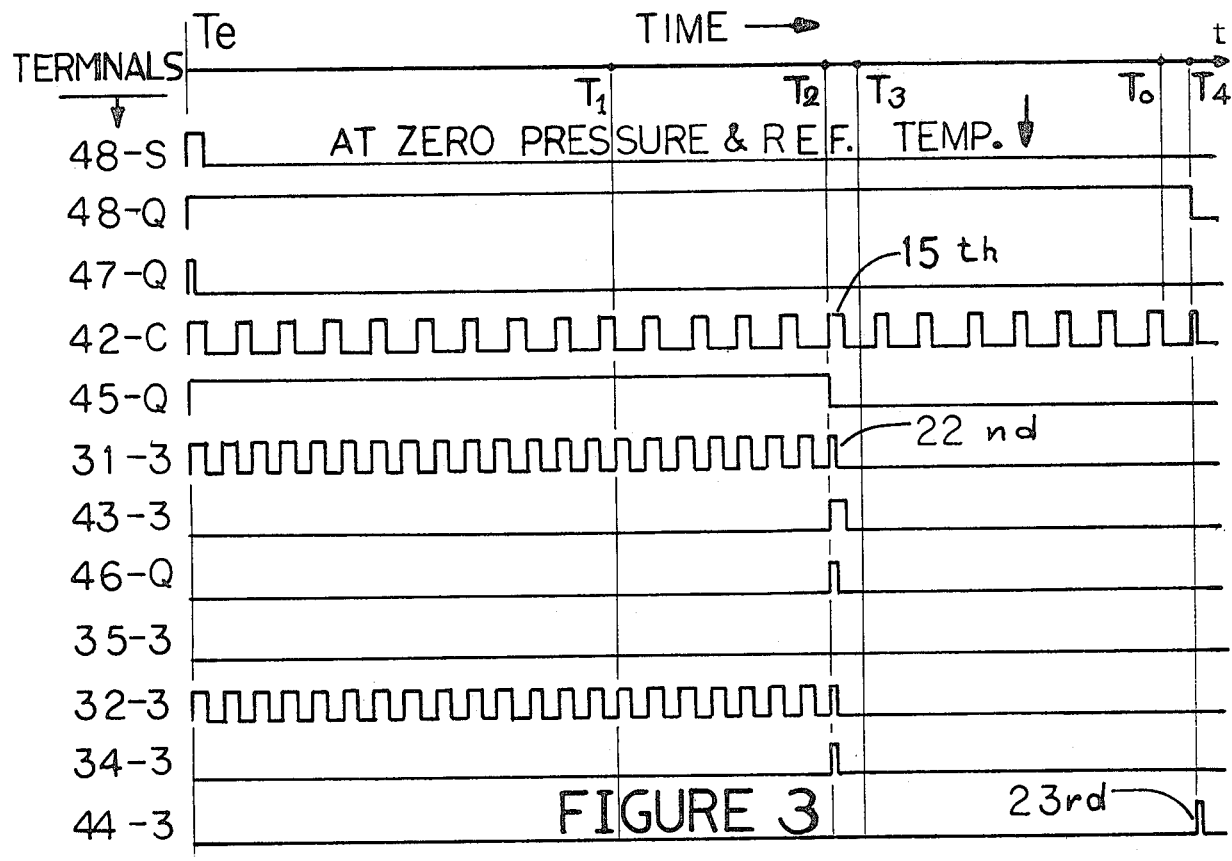
FIGS. 3, 4, 5 and 6 are timing diagrams of the circuit of FIG. 2 for various environmental parameters.

FIG. 3 is a timing diagram for the circuit of FIG. 2 that illustrates the operation of the circuit when the measuring transducer is measuring the pressure and the compensating transducer is measuring temperature, at the condition of zero pressure and normal temperature. The period between $T_e$, the enable pulse, and $T_2$ is the time during which the total number of N pulses are counted by the divide-by-N counter 33. In this case, N corresponds to the 22nd pulse of the circuit arrangement of FIG. 2 and diagram of FIG. 3 of the train of C pulses on terminal 31-3, which is the stream of C pulses that is present on terminal 3 of AND-gate 31, counted by the divide-by-N counter 33. At the instant of the rising edge of the 15th pulse counted by the normalizing accumulator 42, the ambient pulses number of M pulses, $N_{T1}$ is generated. As mentioned before, the accumulation of ambient number of M pulses, $N_{T1}$, disables the AND-gate 31 through flip-flop 45 (terminal 45-Q) and stops the transmission of the C pulses to the divide-by-N counter 33. Under the above conditions, the flip-flop 46 is reset by the Nth pulse of the divide-by-N counter 33 through the OR-gate 36, thus the AND-gate 35 is disabled and the circuit prevents the transmitting of M pulses to the measuring accumulator 50 and the divide-by-N counter 33. Therefore, the measuring accumulator 50 indicates zero pressure. The normalizing accumulator 42, however, continues counting the M pulses of the measuring transducer 10 through the AND-gate 41 up to the 23rd pulse which is identified as $N_{T2}$. At the rising edge of the 23rd pulse, the flip-flop 48 is put into reset state at which instant terminal 48-Q returns to logic-zero state. This, in turn, disables the AND-gate 41. The length of the $N_{T2}$ pulse is much shorter than the pulses generated by that of the measuring transducer 10 because its duration is determined by the reset response of the normalizing accumulator 42. So $T_C-T_4$ is a period of time during which $N_{T2}$ number of M pulses counted by the normalizing accumulator 42 from the measuring transducer 10 whenever its frequency is minimum or a zero measured condition. $T_C-T_o$ is a period of time during which N pulses are counted by the divide-by-N counter 33 if the frequency of the compensating transducer is equal to the frequency of the measuring transducer. N is a fixed number of counts that is selected to coincide with the maximum expected pressure reading or multiple of it. That is, the frequency of the compensating transducer is tailored to follow the measuring transducer frequency which corresponds to its maximum reading. $N_{T1}$ is the ambient number and is the number of measuring transducer pulses (a pressure transducer's pulse in FIGS. 3 through 6) counted during the period of $T_1$ by the normalizing accumulator 42 or the normalizing period.

As referred to in FIGS. 3 through 6, $N_{T1}$ is set to be 15. $N_P$ is the number of pulses from the measuring transducer counted by the divide-by-N counter 33 and the measuring accumulator 50 during the period $T_2-T_1$. In FIG. 3, however, $T_2-T_1$ is equal to zero because the pressure is zero. At the start of the measuring cycle, an enable pulse is applied to terminal 48-S causing terminal 48-Q to rise to logic-one level. Ths will cause a short pulse to be generated on terminal 47-Q of the one-shot multivibrator 47, which will reset the measuring accumulator 50 to zero readout, and set the terminals 45-Q and 49-Q (not in FIG. 3) of the flip-flops 45 and 49, respectively, to logic-one. The terminal C of the normalizing accumulator 42 receives a string of M pulses, which as discussed earlier, is provided by the measuring transducer 10, and in the case of the preferred embodiment, the pressure transducer. During the period of time from the initiation of the enable pulse $T_e$ to $T_2$, there is a logic-one signal generated on terminal 45-Q which allows the C pulses, which in the case of the preferred embodiment is temperature, to be present on terminal 3 of AND-gate 31. When $N_{T1}$ counts have been accumulated, which in this case of FIG. 3 is 15, a positive pulse will be present on terminal 43-3 which in turn will cause a positive pulse to be present on terminal 46-C. However, because divide-by-N counter 33 has already accumulated N pulses and reset the flip-flop 49, terminal 46-D will be at logic-zero level. Consequently, the pulse which is present on terminals 43-3 and 46-C will not set 46-Q to logic-one and enable the AND-gate 35. Thus, there are no M pulses on terminal 35-3 to be accumulated by the measuring accumulator 50. The normalizing accumulator 42 will continue accumulating pulses until it has accumulated $N_{T2}$ pulses, which in the case of the preferred embodiment, equal to $(N+1)$. In which case, normalizing accumulator 42 is reset by the pulse present at terminals 44-1 and 44-3 and the logic-one level on terminal 48-Q returns to the logic-zero state.

Figure 4:
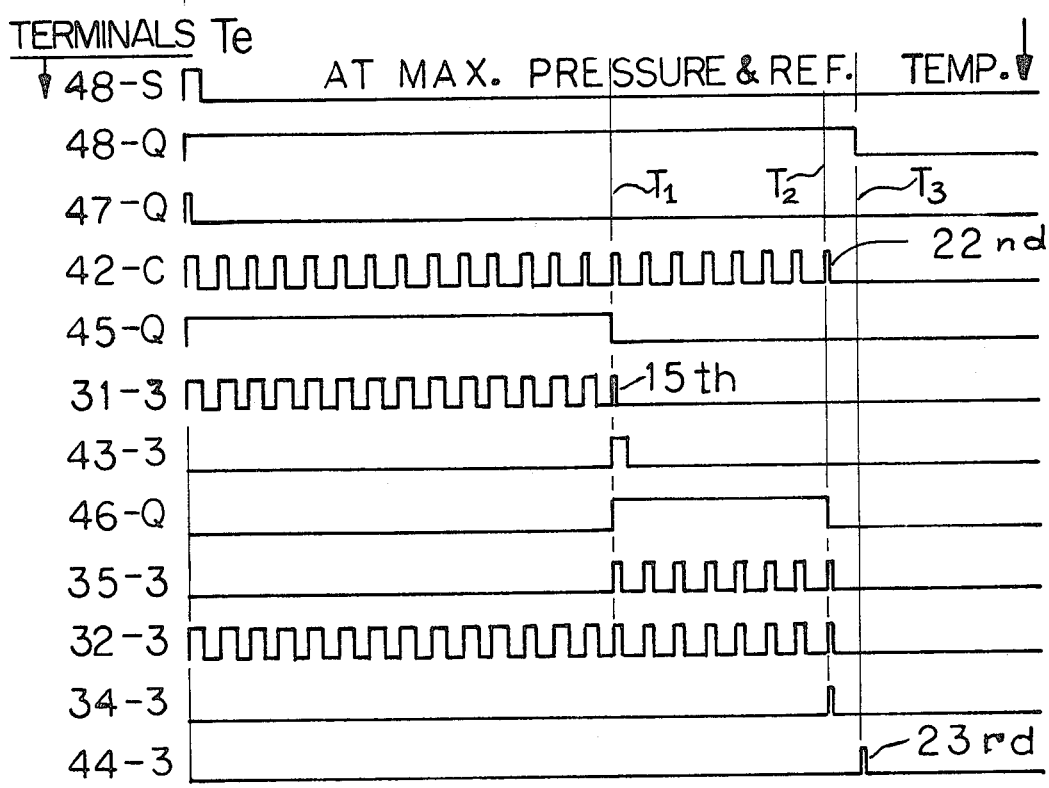

In FIG. 4, which is similar to FIG. 3, except that the measuring transducer is a maximum output. The system again is initialized by the enables pulse, $T_e$, on terminal 48-S which causes a positive level on terminal 48-Q which initiates a pulse on terminal 47-Q. Normalizing accumulator 42 again wll accumulate $N_{T1}$ pulses, which in the case of FIG. 4 is 15, in which case 45-Q returns to the zero state and the C pulses from the compensating transducer 20, which in the case of the preferred embodiment is a temperature transducer, are inhibited. Terminal 46-Q has a positive level at the rising edge of the pulse at $T_1$ which represents the accumulation of $N_{T1}$ pulses and which allows AND-gate 35 to pass the pulses from the measuring transducer 10, as indicated in FIG. 4 by terminal 35-3. The pulses present at the terminal 35-3 are applied to the measuring accumulator 50 as well as to the divide-by-N counter 33 of FIG. 2 with the accumulated values representing the pressure reading. Similarly, when N pulses are accumulated by the divide-by-N counter 33, there is a reset pulse present as indicated, on terminal 34-3 which resets the divide-by-N counter 33 and flip-flops 49 and 46 of FIG. 2, and one pulse later, the normalizing accumulator 42 is reset by the pulse present on terminal 44-3.

Figure 5:
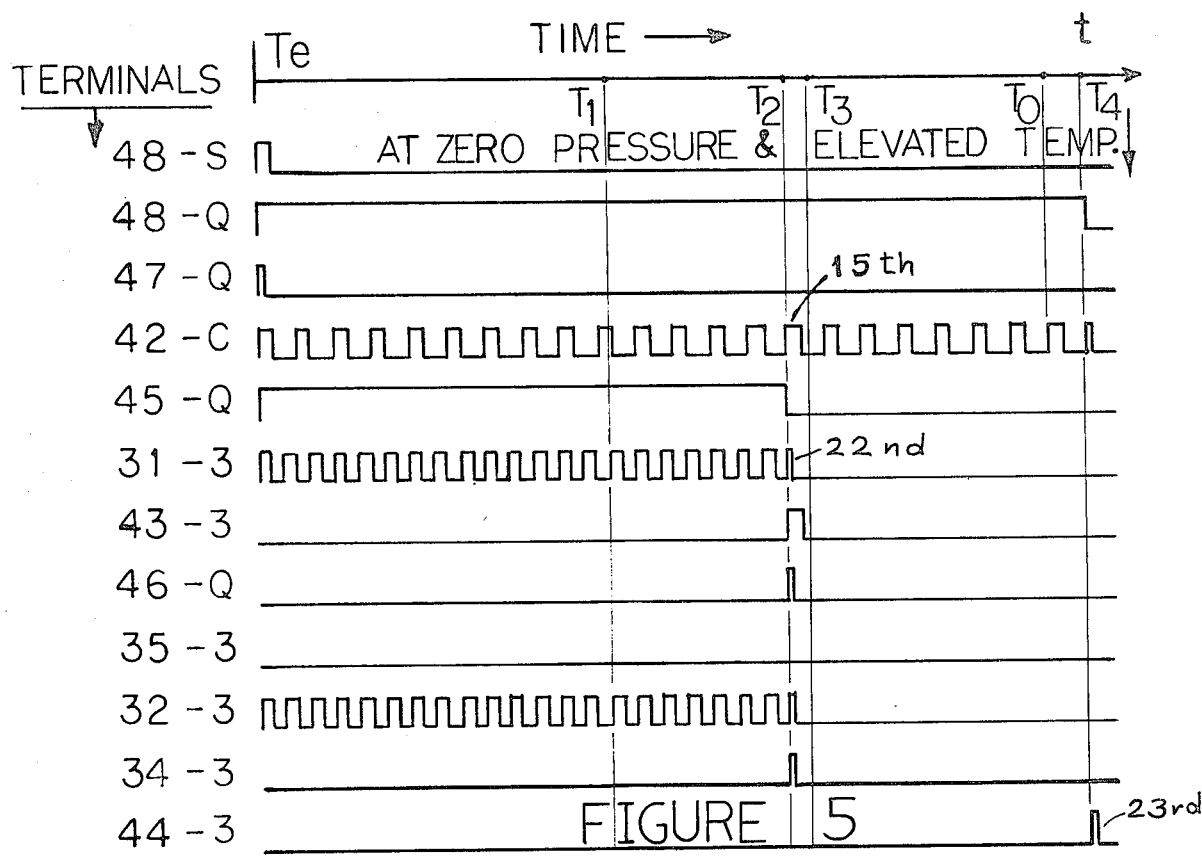

FIG. 5 which is similar to FIG. 3 provides a timing diagram for the case where measuring transducer 10 is measuring zero pressure, and compensating transducer 20 is measuring an elevated temperature. During the period of $T_e-T_2$, the pulses present on terminal 31-3 are, in the preferred embodiment, from the compensator transducer 20. The divide-by-N counter 33 has accumulated N pulses prior to $N_{T1}$ pulses being accumulated by the normalizing accumulator 42 and, as such, there are zero counts accumulated by the measuring accumulator 50.

Figure 6:
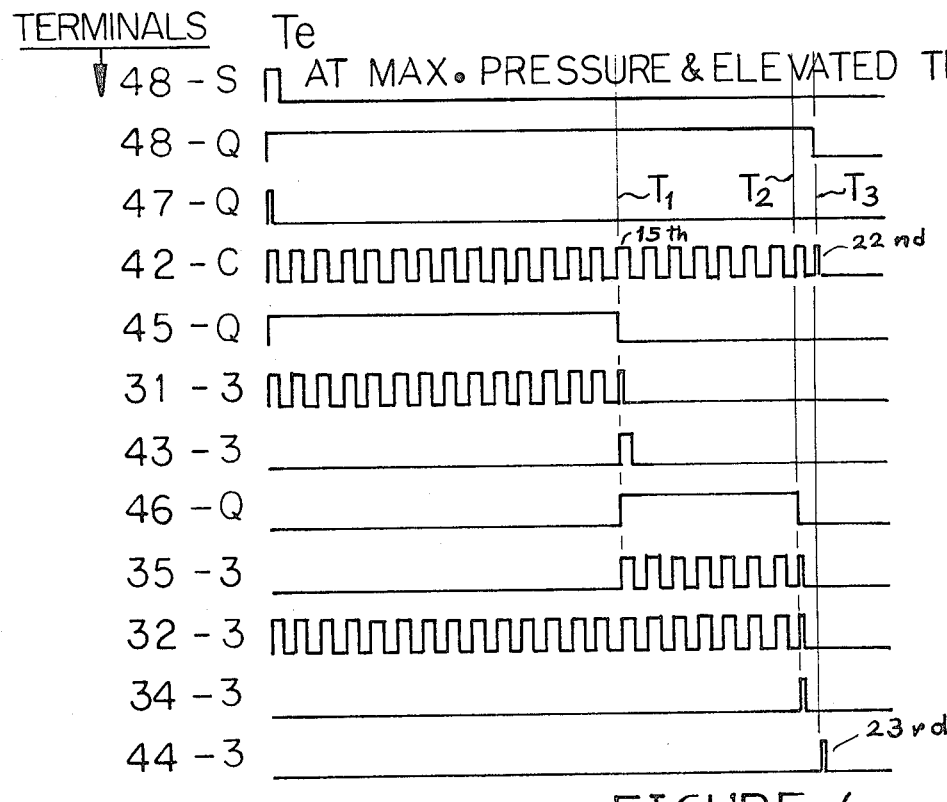

FIG. 6 is a timing diagram of the circuit of FIG. 2 for the situation in which the measuring transducer 10 is measuring a maximum pressure and the compensating transducer 20 is measuring an elevated temperature. When the terminal 48-Q is high, terminal 42-C receives the pulses that comprise the signal from the measuring transducer 10 that is, of course, measuring at an elevated temperature. The accumulation of $N_{T1}$ counts on terminal 21 of normalizing accumulator 42 causes the signal present on 45-Q to return to the logic-zero state, and the pulses from the compensating transducer 20 or temperature transducer are prohibited from appearing on terminal 31-3. At the same instance, terminal 46-Q goes high and the M pulses present on terminal 35-3 are available for accumulation by the measuring accumulator 50 of FIG. 2 and also for application to the divide-by-N counter 33 until N pulses are accumulated, in which case, the reset pulse will be present on terminal 34-3 resetting the divide-by-N counter 33, and one pulse later the normalizing accumulator 42 is reset by the pulse present on terminal 44-3.

It is most important to know or to determine the temperature dependency of the measuring or pressure transducer in the case of the preferred embodiment, so that the temperature transducer can be designed to provide the same frequency deviation. Examination of FIGS. 3 through 6 in relation to the definitions and equations will indicate how the system functions in between 0% and 100% pressure levels. Even though the pressure indication of a transducer is a function of temperature, the real output response is a non linear function of pressure under the effect of temperature at a temperature equilibrium. In the case of bourdon tube transducers, there is no definite curvature of nonlinearity. That is, the shape of the response curve varies according to the composition of the alloys. This is due to the molecular bonding and random crystallization in the alloys. They are, however, uniform for every particular alloy within a band of intolerance. Since the time durations $T_1$ and $T_2$ are functions of the measuring transducer response, the number of compensating transducer pulses which are counted during these time periods are functions of measuring transducer response as well as the environmental conditions whose effect is being compensated. In the preferred embodiment, as the temperature rises, more pulses from the temperature transducer will be stored in the divide-by-N counter 33 in order to make up the difference in the number of M pulses due to the rise in the frequency of the pressure transducer. It is important to note the fact that the number of temperature transducer pulses counted by the divide-by-N counter 33 is a function of two variables, pressure and temperature. Hence, the number of pressure transducer pulses counted by the divide-by-N counter 33 and measuring accumulator 50 is compensated.

Many changes and modifications in the above-described embodiment of the invention can, of course, be carried out without departing from the scope thereof. Accordingly, to promote the progress in the science and useful arts, the invention is disclosed and intended to be limited only by the scope of the appended claims.

I claim:

1. A compensating transducer digitizer for compensating the digital output of a measuring transducer with the digitial output of a compensating transducer, comprising:
   first accumulator means for accumulating a first preselected number $N_{T1}$ of M pulses from the measuring transducer;
   gate means for providing a second preselected number of pulses N, the second preselected number of pulses N being the gated digital output from the compensating transducer when the gate means is at a first state and the gated digital output from the measuring transducer when the gate means is in a second state;
   second accumulator means for accumulating the second preselected number of pulses N;
   first load means for loading in the first accumulator means, the M pulses from the measuring transducer during a period of time $T_i$ that the first preselected number of pulses, $N_{T1}$ are being accumulated;
   second load means for setting the gate means to the first state to load in the second accumulator means, the second preselected number of pulses N that include C pulses from the compensated transducer stored in the second accumulator means during the period of time $T_1$ that the M pulses are stored in the first accumulator means until $N_{T1}$ pulses are accumulated and to set the gate means to the second state to load the M pulses from the measuring transducer if the number of C pulses is less than the second preselected number of pulses N, or until the second preselected number of pulses N is accumulated if the second preselected number of pulses N is greather than the first preselected number of pulses $N_{T1}$; and
   third accumulator means for accumulating the difference of M pulses between the number of C pulses accumulated during the time periopd $T_1$ and the second preselected number of pulses N, said difference being the compensated digital output of the measuring transducer.

2. The compensating transducer digitizer for compensating the digital output of a measuring transducer with the digital output of a compensating transducer according to claim 1 wherein the measuring transducer is a pressure transducer and comprises:
   a bourdon tube;
   a conductive plate connected in parallel configuration with the bourdon tube separated therefrom by a preselected distance and electrically isolated therefrom; and
   an electric oscillator connected to the bourdon tube and the conductive plate and whose frequency is determined by the electric reactance between the bourdon tube and the conductor.

3. The compensating transducer digitizer according to claim 1 wherein the compensating transducer is a temperature transducer and comprises:
   a bourdon tube filled with a liquid;
   a conductive plate connected in parallel configuration with the bourdon tube separated therefrom by a preselected distance and electrically isolated therefrom; and
   an electrical oscillator connected to the bourdon tube and the conductive plate and whose frequency is determined by the electrical reactance between the bourdon tube and the conductor.

4. The compensating transducer digitizer according to claim 1 wherein the first load means comprises:
- a decoder circuit for providing a pulse when the first accumulator means has sccumulated the first preselected number, $N_{T1}$, of pulses; and
- a gate whose output is connected to the input of the second accumulator means and which conducts the pulses from the compensating transducer during the period of time when $N_{T1}$ pulses are being accumulated and blocks the pulses from the compensating transducer during the period of time after $N_{T1}$ have been accumulated.

5. The compensating transducer digitizer according to claim 1 wherein the second load means comprises:
- a gate between the output of the measuring transducer and the second accumulator for conducting the pulses from the measuring transducer to the second accumulator means after the accumulation of $N_{T1}$ pulses.

6. The compensating transducer digitizer according to claim 1 further comprising:
- fourth accumulator means for accumulating a fourth preselected number of pulses $N_{T2}$ of M pulses from the measuring transducer: and
- reset means for resetting the first accumulator means and the fourth accumulator means after the accumulating of the second preselected number $N_{T2}$ of M pulses.

7. A method for compensating the digital output of a measuring transducer with the digital output of a compensating transducer, comprising:
- accumulating a first preselected number of pulses $N_{T1}$ from the measuring transducer;
- providing a second preselected number of pulses N from the compensating transducer when a gate means is in a first state and from the measuring transducer when the gate means is in a second state;
- storing the pulses from the compensating tranucer during the period of time $T_1$ that the pulses $N_{T1}$ are being accumulated; and
- accumulating the second preselected number of pulses N;
- setting the gate means to a first state during time $T_1$;
- storing M pulses from the measuring transducer when the number of pulses stored during the period of time $T_1$ is less than the preselected number of pulses N and to set the gate means to the second state until the preselected number of pulses N is accumulated, the compensated digital output of the measuring transducer being the difference between the number of pulses from the compensating transducer stored during the period of time $T_1$ and the accumulating of the second preselected number of pulses N.

* * * * *